United States Patent [19]
Akita et al.

[11] Patent Number: 5,383,221
[45] Date of Patent: Jan. 17, 1995

[54] MOBILE STATION UNIT AND CHANNEL SWITCHING METHOD

[75] Inventors: Yoshihiro Akita, Tokyo; Masakazu Shirakawa, Kawasaki, both of Japan

[73] Assignee: Kabushiki Kaisha Toshiba, Kawasaki, Japan

[21] Appl. No.: 842,614

[22] Filed: Feb. 27, 1992

[30] Foreign Application Priority Data

Mar. 1, 1991 [JP] Japan .................................. 3-036271

[51] Int. Cl.[6] .............................................. H04B 1/38
[52] U.S. Cl. ...................... 375/7; 455/56.1; 455/33.2
[58] Field of Search .................... 375/7, 107; 455/33.1, 455/54.1, 54.2, 33.2, 56.1; 379/60; 370/95.1, 95.3

[56] References Cited

U.S. PATENT DOCUMENTS

| | | | |
|---|---|---|---|
| 4,947,452 | 8/1990 | Hattori et al. | 455/33.3 |
| 5,081,704 | 1/1992 | Umeda et al. | 455/33.1 |
| 5,117,502 | 5/1992 | Onoda et al. | 379/60 X |

Primary Examiner—Tesfaldet Bocure

Attorney, Agent, or Firm—Banner, Birch, McKie & Beckett

[57] ABSTRACT

In a mobile radio system including at least one mobile station unit and a plurality of base station units, the mobile station unit communicates with a base station through time-division multiplexed control and communication channels. The mobile station unit includes a line quality detecting section for detecting the deterioration of the line quality occurring during communication, and a control section for controlling the entire unit. The control section includes a retrieval section which, when the deterioration of the line quality is detected by the line quality detecting section, interrupts current communication with a base station unit during a predetermined period, receives a control channel from another (new) base station unit during that period and then retrieves predetermined information, and a channel switching section which, when the predetermined information can be detected by the retrieval section, terminates the current communication with the base station and performs a process of connection to the new base station unit on the basis of the predetermined information.

13 Claims, 7 Drawing Sheets

MOBILE STATION UNIT AND CHANNEL SWITCHING METHOD

BACKGROUND OF THE INVENTION

1. Field of the Invention

The present invention relates to a mobile station unit which is movable from one of zones (communication areas) that are controlled by base station connecting units to another zone and capable of communication with another station through the connecting unit for a zone where it is located.

2. Description of the Related Art

A mobile radio system is a communication system in which individuals and moving vehicles carry mobile stations which are one type of radio equipment to thereby permit communication with a telephone network and between mobile stations. Being very convenient, the system has had a tendency to spread rapidly.

Figure 6:
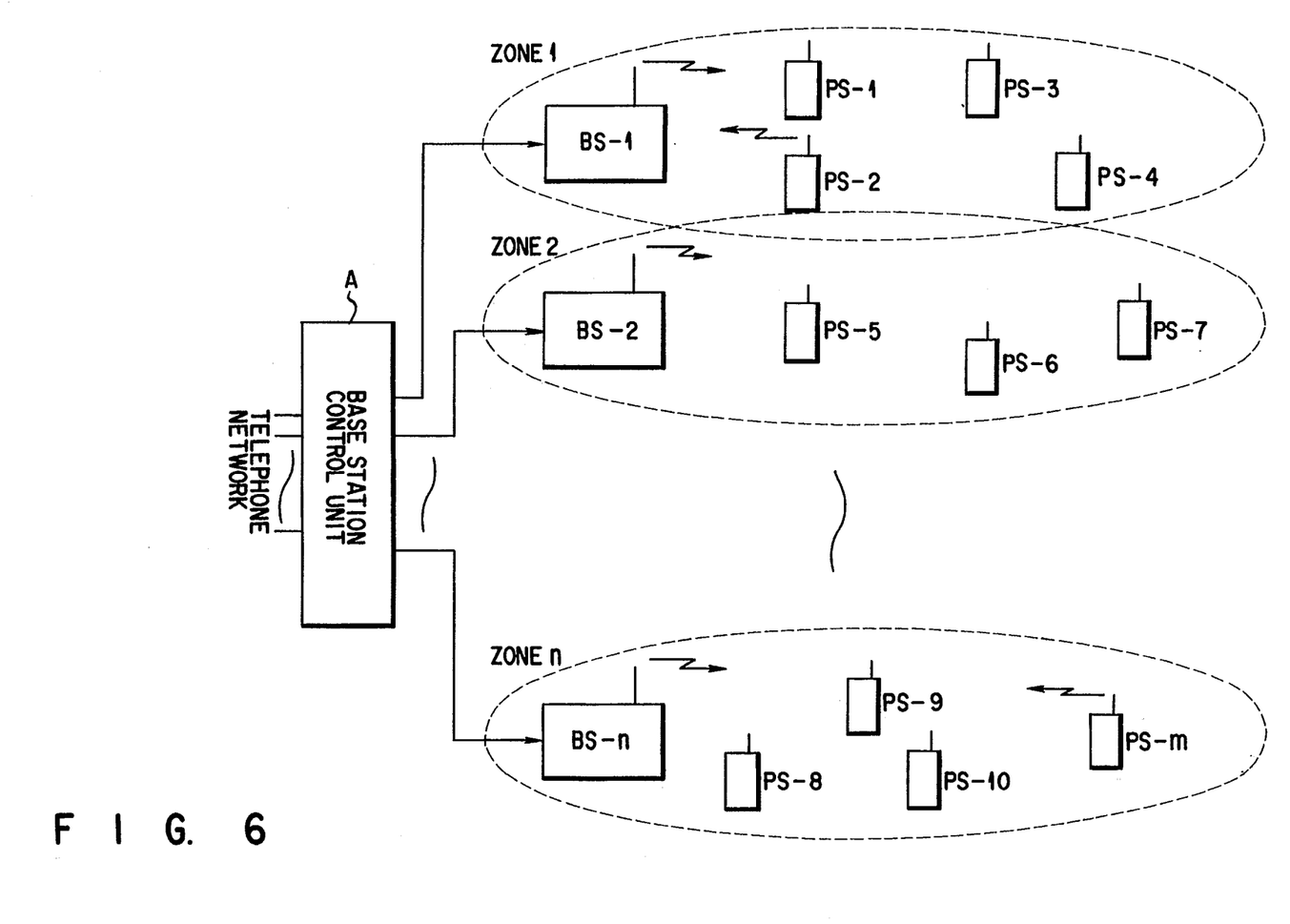
FIG. 6 is a conceptual diagram of a general mobile radio system.

FIG. 6 is a schematic illustration of a mobile radio system. The system is constructed from a base station control unit A, base station connecting units BS-1, BS-2, ..., BS-n, and mobile station units (e.g., cellular radios) PS-1, PS-2, ..., PS-n.

The base station control unit A makes connection (communication) between a telephone network and each of the mobile station units through a respective connecting unit and connection between mobile station units present in zones that different connecting units cover. The connecting units BS-1 to BS-n control first to n-th zones, respectively, which are their respective service areas and have communication control of mobile station units within their respective zones. Even if each of the mobile station units PS-1 to PS-m, which are radio telephones, moves to any of the first to n-th zones, it is permitted to communicate with the connecting unit covering a zone where it is located. Transmission of information through control and communication channels between the connecting units BS-1 to BS-n and mobile station units PS-1 to PS-m is made on a time division multiplex (TDM) basis. Connection between one of the connecting units BS-1 to BS-n and mobile station units within the zone covered by it is made by time division multiple access (TDMA).

In such a system as described above, when a mobile station unit moves from a zone to another zone while in communication, it is required to switch between communication channels because the mobile station unit is switched from a connecting unit to another. Conventional mobile stations make the switching between communication channels as follows.

Before proceeding with a description of the switching between communication channels, it will serve us to explain physical slots of the connecting units BS-1 to BS-n.

Figure 7:
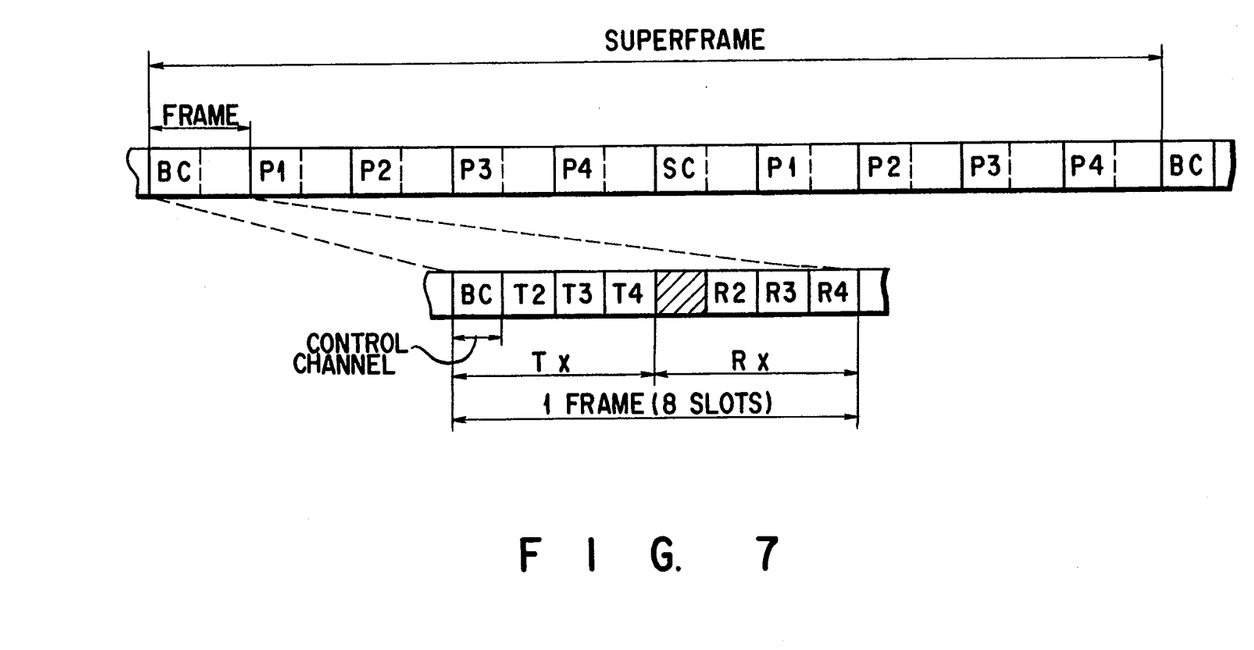
FIG. 7 is a conceptual diagram of physical slots of connecting units.

FIG. 7 is a conceptual diagram illustrating one example of physical slots of the connecting units. That is, the physical slots of the connecting units comprise a sequence of superframes each of which consists of a plurality of frames as shown. More specifically, the superframe comprises ten frames. Moreover, each frame comprises eight slots. Of the eight slots, the first-half four slots indicated by Tx are allocated for transmission and the latter-half four slots indicated by Rx are allocated for reception. It should be noted that the above "transmission" and "reception" are intended to represent transmission from and reception by the connecting units. Thus, the relationship of the transmission and reception is reversed in the case of transmission from and reception by the mobile stations.

The leading slot of each frame is allocated for control channels. In each frame, the control channels are allocated to a broadcast channel (BCCH), paging channels PCH (in this example, there are four general calling channels, P1CH, P2CH, P3CH and P4CH), and a specific cell control channel (SCCH). That is, in FIG. 7, the frame control channel indicated by BC is used as BCCH, the frame control channels indicated by P1 to P4 are used as P1CH to P4CH, and the frame control channel indicated by SC is used as SCCH. The remaining slots in each frame which are indicated by T2, T3, T4, R2, R3, and R4 are communication channels.

Subsequently, the channel switching operation will be described.

Usually, the line quality is monitored during communication. However, once the deterioration of the line quality is detected, a communication channel in use is disconnected and the BCCH is retrieved. If the BCCH can be detected at this time, the self-PCH is calculated from a part of the system configuration parameters informed by the BCCH and from a predetermined self-ID, so that the corresponding PCH is retrieved. Next, upon receipt of a frame containing the corresponding PCH, the mobile station unit sends a link establish request to the connecting unit by the use of the control channel transmission slot (the fifth slot) of the same frame or the transmission slot (the fifth slot) of a subsequent frame containing SCCH. After the link has been established, a communication channel is set and communication is restored through the set communication channel.

There are two methods of setting frequencies of the control channels: fixed and variable (say, about 50 channels). In a system in which the control channel frequencies are fixed, when the deterioration of the line quality is detected, the receiving frequency is switched to a control channel frequency and then each channel is retrieved as described above. In a system in which the control channel frequencies are variable, the receiving frequency is sequentially changed at intervals of some tens of miliseconds to some hundreds of miliseconds (in the case of a frame period of 5 miliseconds), during which time the control channel is identified, and the BCCH is retrieved on the basis of a channel identifier. After the detection of the control channel, the same as described above is performed.

As described above, in the conventional mobile station unit, when the deterioration of the quality is detected, a phenomenon will occur in which communication is interrupted for a relatively long period of time that elapses from the initiation o receipt of the control channel to the time when a communication channel is set to restore communication after the detection of the BCCH, PCH and SCCH. The communication interruption period is particularly long in the case there the control channel frequencies are variable.

As described above, at the time of switching between channels when moving from a zone to another zone, the conventional mobile station unit is arranged to disconnect a communication channel and then receive control channels a point of time when the deterioration of the line quality is detected, thus making the communication interruption time long. This will make users unpleasant.

SUMMARY OF THE INVENTION

It is an object of the present invention to provide a mobile station unit which permits a communication interruption time occurring at the time of switching between channels when it moves from a zone to another zone to be shortened.

A mobile station unit of the present invention includes a line quality detecting section for detecting the deterioration of the line quality during communication, and a retrieval section which, when the deterioration of the line quality is detected by the line quality detecting section, interrupts current communication with a base station only during a predetermined period and receives a control channel from another new base station during that period to retrieve predetermined information.

When the predetermined information can be detected by the retrieval section, the current communication with the base station is terminated and a process of connection to the new base station is performed on the basis of the detected predetermined information.

With the mobile station unit configured as described above, after the deterioration of the line quality has been detected, current communication with a base station is interrupted only during a predetermined period and a control channel from another base station is received during that period to retrieve predetermined information from the control channel when the predetermined information can be detected, the current communication is terminated and then a process of connection to the new base station is performed on the basis of the detected information.

Though communication interruption occurs for a short time interval that elapses from the detection of the deterioration of the line quality until the predetermined information is detected, the time interval is not so long as to make users unpleasant and thus the original communication state can be restored momentarily.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
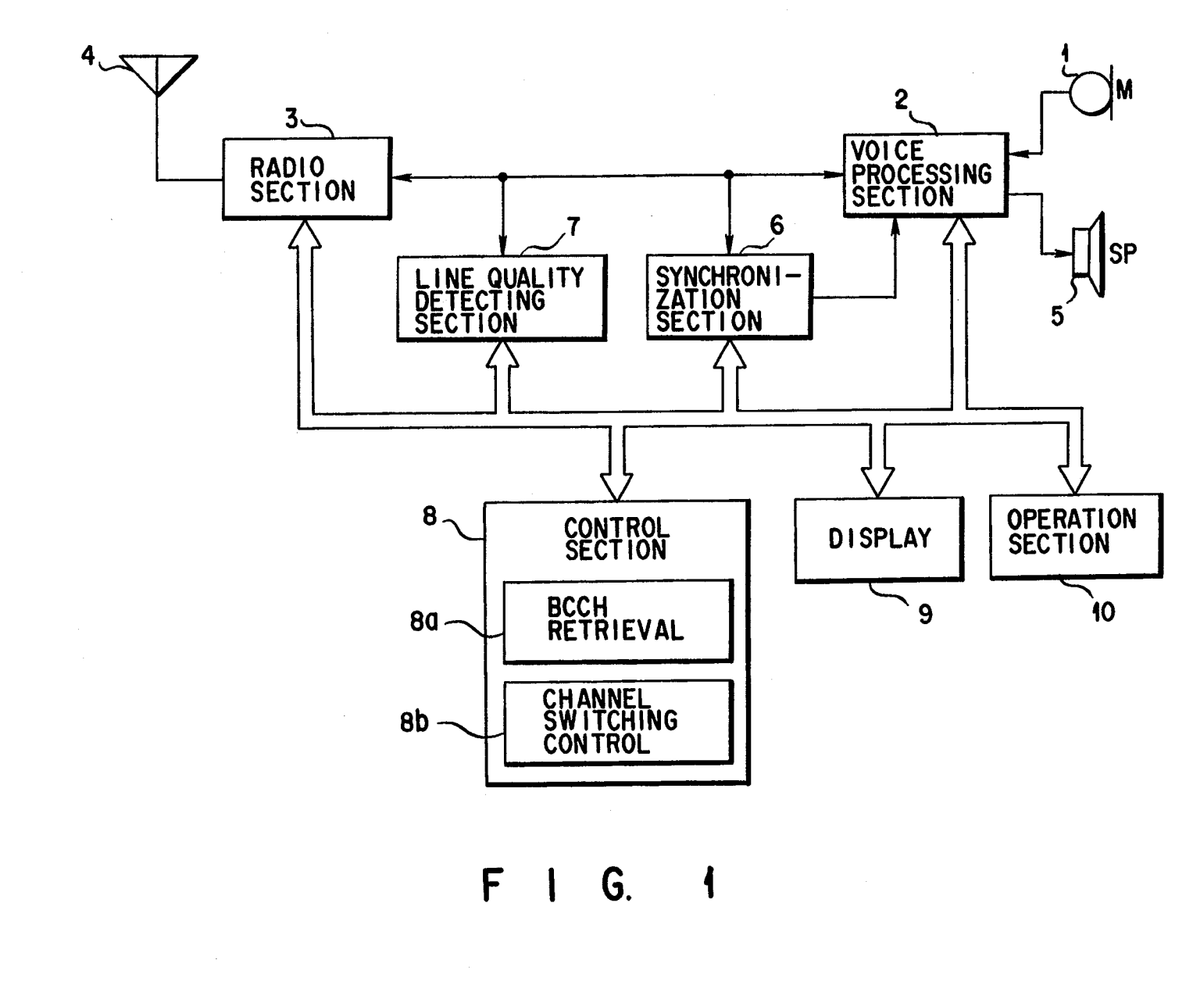
FIG. 1 is a functional block diagram of a mobile station unit embodying the present invention.

Referring now to FIG. 1, there is shown a mobile station unit (mobile radio unit) of the present invention in block form. In this mobile station unit, a voice signal obtained by a microphone 1 adapted for voice-to-electricity conversion is subjected to coding (conversion to digital form) and preprocessing, such as baseband processing, in a voice processing section 2 including a code and a baseband processing circuit and then sent to a radio section 3. The radio section 3 modulates input voice data and then radiates it from an antenna 4 to a connecting unit at predetermined times.

A radio-frequency signal from another station is received by the antenna 4 and then applied to the radio section 3. The radio section 3 extracts a desired slot from the incoming radio-frequency signal, demodulates it and then applies the demodulated signal to the voice processing section 2. The voice processing section 2 performs baseband processing and decoding (conversion to an analog signal) processing on incoming voice data. As a result, a voice signal is output from a loudspeaker 5 as voice. The voice processing section 2 performs the above processing on the basis of a timing signal extracted by a synchronization section 6.

A line quality detecting section 7, connected to the radio section 3 and a control unit 8 to be described later, detects the degree of deterioration of the line (communication) quality on the basis of the condition of a signal received.

The control section 8 which controls the entire mobile station unit is connected to each of components comprising the unit. The control section, which has a microcomputer as its main control circuit, comprises a well-known general control section for the mobile station, a BCCH retrieval section 8a and a channel switching control section 8b. The BCCH retrieval section 8a sets the receiving frequency of the radio section 3 to a control channel frequency only during a predetermined frame period within one superframe period to retrieve the BCCH after the line deterioration has been detected by the line quality detecting section 7. The channel switching section 8b switches between communication channels after the BCCH has been detected by the BCCH detecting section 8a.

The mobile radio unit has a display section 9 and an operation section 10 which are well known components.

Figure 2:
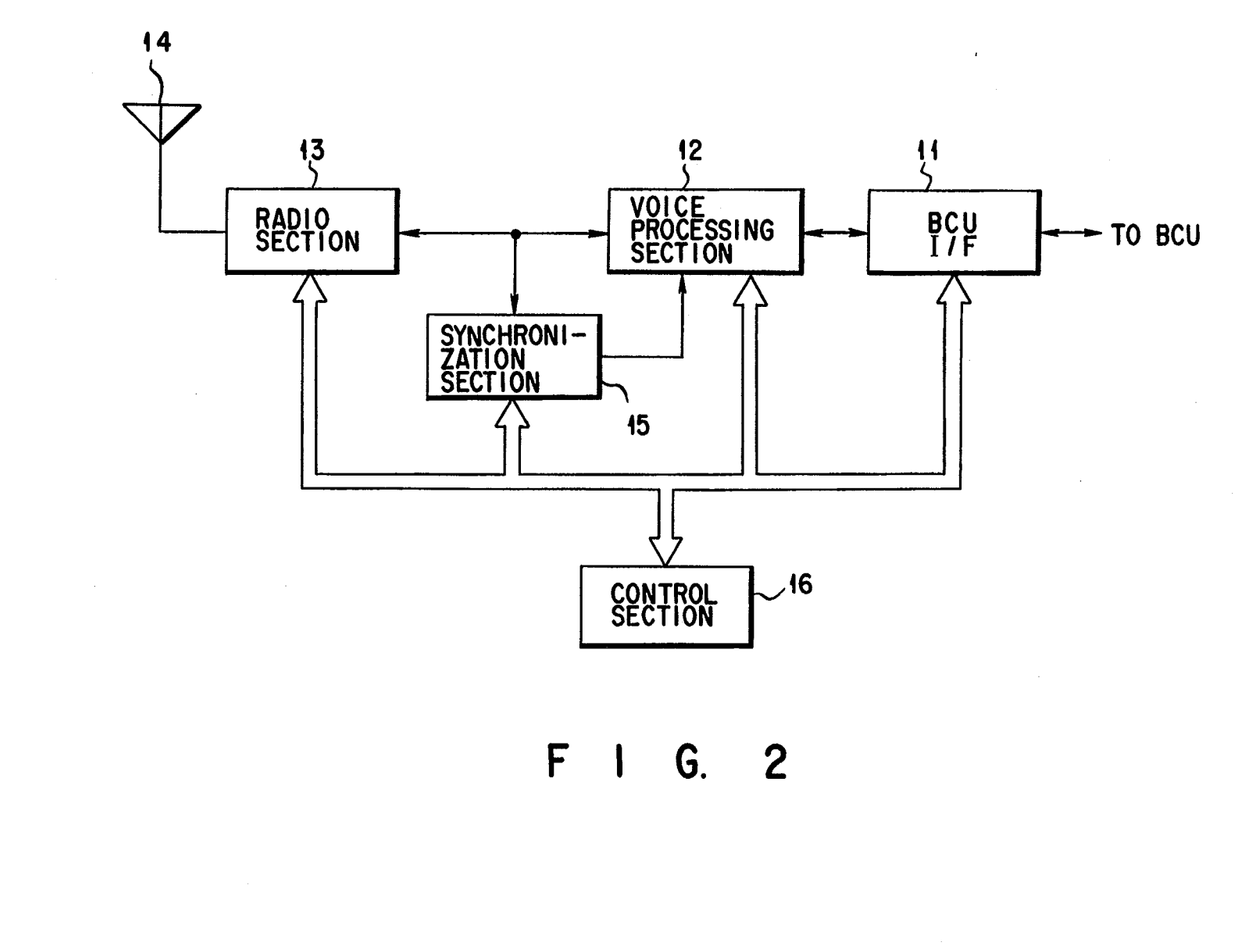
FIG. 2 is a functional block diagram of a connecting unit.

In FIG. 2, there is shown a base station connecting unit in block form. In the figure, BCU I/F 11 interfaces with a base-station control unit (BCU) not shown. A voice signal (digital signal) from the BCU is applied to a voice processing section 12, comprising a baseband processing circuit and a TDM circuit which are not shown, via the BCU I/F 11. The voice signal is subjected to baseband processing and TDM processing in the voice processing section 12 and then applied to a radio section 13. The radio section 13 performs postprocessing, such as modulation and slot processing, on voice data from the voice processing section 12 and radiates it from an antenna 14 to a corresponding mobile station at predetermined times.

A radio-frequency signal from another station is received by the antenna 14 and then applied to the radio section 13. The radio section extracts a desired slot from the radio-frequency signal for demodulation and then applies the demodulated signal to the voice processing section 12. The voice processing section performs demultiplexing and baseband processing on the incoming voice data to reproduce a voice signal (digital signal). The voice signal reproduced by the voice processing section 12 is applied to the BCU via the BCU I/F 11. The voice processing section performs the above processing on the basis of timing signals extracted by a synchronization section 15. A control section 16 is connected to each of the components comprising the connecting unit and controls it in accordance with a predetermined operating procedure.

Figure 3:
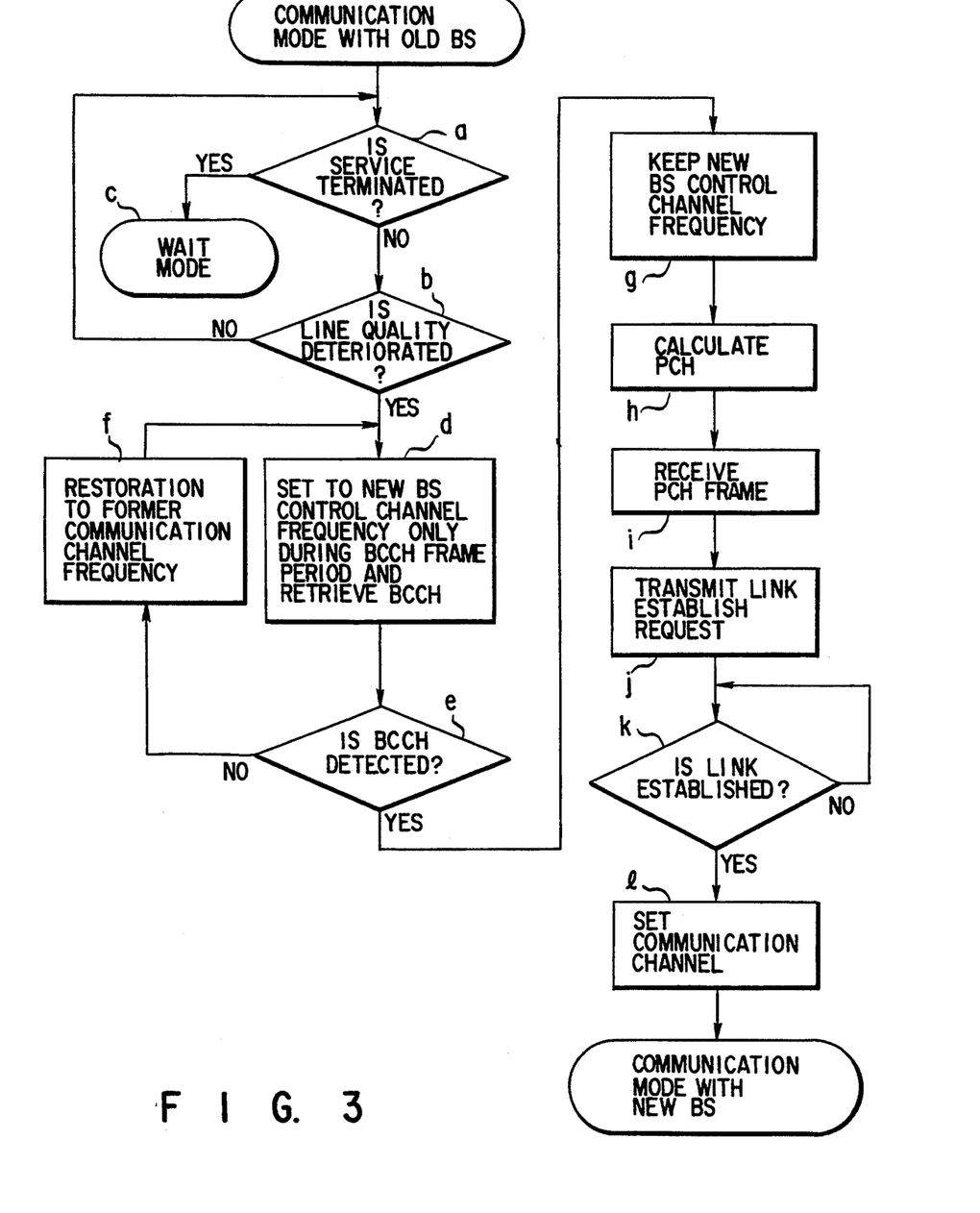
FIG. 3 is a flowchart illustrating the procedure of the control unit of FIG. 1.

Next, the channel switching operation of the mobile radio unit configured as described above will be described in accordance with the procedure of the control section 8. Hereinafter, a connecting unit with which a mobile station is currently in communication will be described as an old BS and a connecting unit with which the mobile station is to communicate anew will be described as a new BS. It is assumed that the physical slots of the connecting units included in the system are synchronized with one another.

As shown in the flowchart of FIG. 3, in communication mode with the old BS, the control section 8 repeats supervision of clearing-out (termination of service) in step a and supervision of line-quality degradation in step b as a supervisory loop. When service terminates, the control section 8 shifts the operating procedure from step a to step c, so that it enters the wait mode.

On the other hand, when the deterioration of the line quality for the old BS is detected by the line quality detector 7 because the mobile radio unit moves from the old BS zone to the new BS zone, the control section 8 shifts the operating procedure from step b to step d. In step d, the control section 8 sets the receiving frequency of the radio section 3 to the frequency (fixed) of the control channel of the new BS only during the period of a frame (BCCH frame) having its control channel allocated the BCCH of frames within one superframe and retrieves the BCCH during that period. In subsequent step e, the control section 8 decides whether or not the BCCH has been detected in step d. If the BCCH has not been detected, the control section 8 restores the receiving frequency of the receiving section 3 to the former communication channel frequency in step f and then repeats steps d and c. Thus, the line is kept communicating until the next BCCH frame period arrives. Note that the operations in steps d to f are performed by the BCCH retrieve section 8a.

If the BCCH has been detected in step d, on the other hand, the control section 8 shifts the operating procedure from step e to step g. In step g, the control section 8 keeps the receiving frequency of the receiving section 3 the new control channel frequency and subsequently makes connection to the new BS in accordance with the same procedure as in the prior art in steps h and i. In this way the operation enters the communication mode with the new BS. Note that the operations in steps g to i are performed by the channel switching control section 8b.

The above operations will be described more specifically with reference to the physical slots of the mobile radio units shown in FIG. 4.

Until the deterioration of the line quality is detected, transmission and reception are made in each frame (every ½ frame). That is, reception is made during a slot period corresponding to one of the three communication channels of the first half of one frame, while transmission is made during a slot period corresponding to one of the three communication channels of the second half of one frame.

Once the deterioration of the line quality is detected by the line quality detector 7 in the normal state (at time T1), unlike the prior art in which communication interruption occurs because the reception of the control channel is initiated in the next frame (at time T2), the mobile radio unit of the present invention continues the same transmitting and receiving operation of the communication channel as described above until the leading BCCH frame of the next superframe arrives.

When the BCCH frame arrives (at time T3), the mobile radio unit causes communication interruption to start receiving the control channel and retrieve the BCCH. At this time, if the BCCH is not detected as shown in FIG. 4, the mobile radio unit resumes the transmitting and receiving operation of the communication channel from the next frame (at time T4).

After this, each time the BCCH frame arrives, the mobile radio unit causes communication interruption so as to receive the control channel and retrieve the BCCH only during the period of the BCCH frame. When the BCCH is detected (at time T5), the mobile radio unit continues the reception of the control channel in the following frames as well (at and after T6) and then terminates communication with the old BS. Subsequently, the well-known connection procedures, such as calculation of PCH, reception, and transmission of a request for link establishment, are performed (at time T7) to initiate communication with the new BS. Note that FIG. 4 is illustrated on the assumption that the present mobile radio unit is allocated P2CH as PCH by the new BS.

According to the present embodiment, as described above, the communication with the old BS is continued even after the deterioration of the line quality has been detected and the communication is interrupted only during the BCCH frame period (a short period) to receive the control channel and retrieve the BCCH. When the BCCH cannot be detected, the communication with the old BS is resumed. Thus, though an instantaneous interruption of one frame occurs for each superframe until the BCCH is detected, the communication can be continued. Because one frame period is generally short, say, of the order of 5 ms, and the line quality is deteriorated in a zone switching area, the instantaneous interruption of one frame will not have an adverse effect on the communication quality.

The period during which communication is interrupted is only a short interval that elapses from when the BCCH is detected until the connection to the new BS is completed, i.e., an interval when the connection processing is performed. Thus, the present invention can achieve a considerable reduction in the communication interruption time as compared with the prior art. To be specific, in the case of FIG. 4, for example, the communication interruption time can be reduced by ten frame periods as compared with the prior art, namely, 50 ms in the case where one frame period is 5 ms. The larger the communication system, the greater the effect of shortening of the communication interruption time becomes.

The above is a description of a mobile radio unit that is applied to a system in which setting of the control channel frequency is fixed. The present invention is also applicable to a system in which setting of the control channel frequency is variable. Thus, an embodiment of a mobile radio unit that is applied to the system in which the control channel frequency is variable will be described below.

The mobile radio unit of the present embodiment is identical in basic configuration to that of the foregoing embodiment but differs only in the control procedure of the control section 8, and thus description of its configuration will be omitted.

Figure 5:
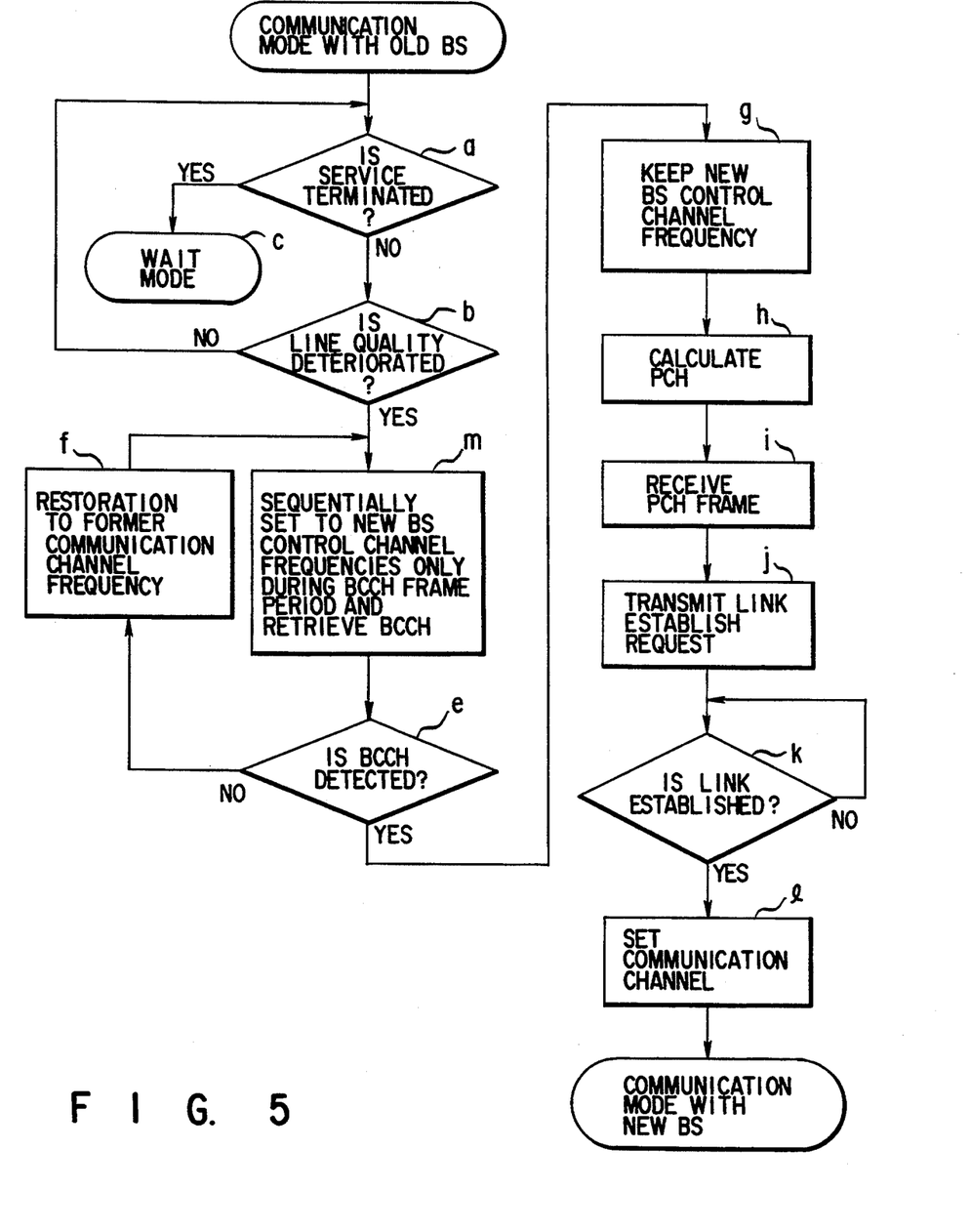
FIG. 5 is a flowchart illustrating the procedure of a mobile station unit according to the other embodiment of the present invention.

FIG. 5 illustrates the procedure of the control section 8 of the mobile radio unit of the present embodiment. The procedure in the present embodiment differs from that in the foregoing embodiment in that, after the deterioration of the line quality is detected in step b, the receiving frequency set at the receiving section 3 is sequentially switched to each of two or more frequencies allocated to the control channel of the new BS only during the BCCH frame period for retrieval of the BCCH in step m. In other respects both the procedures are substantially the same.

Figure 4:
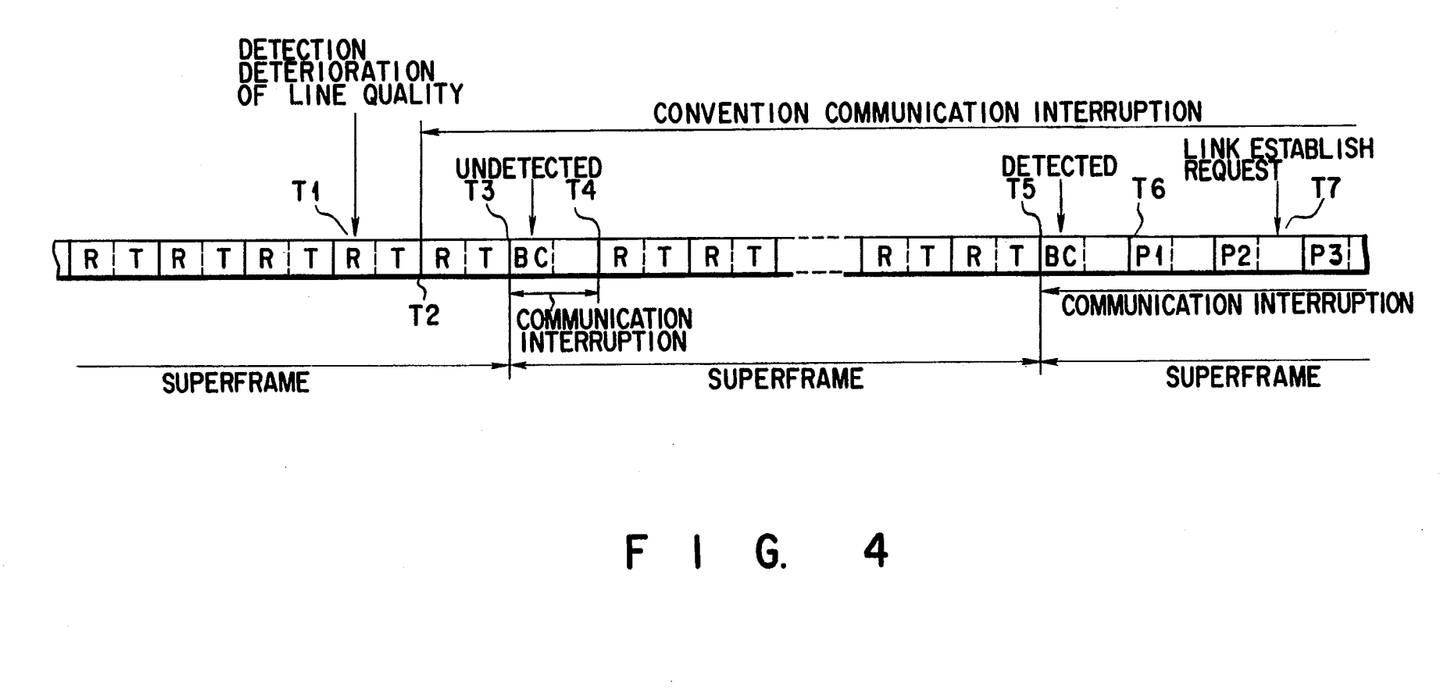
FIG. 4 is a conceptual diagram of physical slots of mobile station units.

The specific operation of the mobile radio unit of the present embodiment is substantially the same as in FIG. 4 but mainly differs in that the receiving frequency varies from BCCH frame to BCCH frame.

According to the present embodiment, even in the case where the control channel frequency is variable, communication state can be maintained until the BCCH can be detected. Moreover, the present embodiment will provide the same advantages as the foregoing embodiment. Supposing that the BCCH can be detected at the tenth frequency of the control channel frequencies, the unit configured as in the present embodiment will shorten the communication interruption time to 450 to 500 ms in the case where one frame period is 5 ms and one superframe period is 50 ms.

The present invention is not limited to the present embodiment. For example, the present embodiment is configured such that communication is interrupted only during the BCCH frame period for retrieval of the BCCH. Alternatively, communication may be interrupted over periods of two or more frames including the adjacent frame for retrieval of the BCCH.

The present embodiment is described on the assumption that the physical slots of the connecting units included in the system are synchronized with one another (the connecting units are the same in the timing of sending of the BCCH). Alternatively, even in the case where the physical slots of the connecting units are not synchronized with one another, if the timing of the physical slot of each connecting unit is known, the BCCH can be retrieved during the corresponding BCCH frame period. Other embodiments and modifications are possible.

A mobile station unit of the present invention is equipped with a line quality detecting section which detects the deterioration of the line quality during communication, and a retrieval section which, when the deterioration of the line quality is detected by the line quality detecting section, interrupts communication with a base station connecting unit during a predetermined period, for example, a BCCH frame period, and receives a control channel during that period for retrieval of predetermined information such as a broadcast channel and configured so as to, when the predetermined information is detected by the retrieval section, terminate communication with the base station connecting unit with which the mobile radio unit is currently in communication and perform a process of connection to another base station connecting unit based on the detected predetermined information. As a result, the mobile station unit permits the time of communication interruption caused by channel switching occurring when it moves from a zone to another zone to be shortened to a very short time.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A mobile station unit connectable to first and second base station units over control and communication channels arranged in frames each including communication channel time slots corresponding to respective communication channels and at least one control channel time slot corresponding to a control channel, said mobile station unit comprising:

a voice processing section including processing means for processing an input voice signal and for processing input voice data, means for encoding the input voice signal to produce output voice data, and means for decoding the input voice data to produce an output voice signal outputtable to a speaker;

a radio section including means for receiving modulated voice data during a first communication channel time slot corresponding to a first communication channel, means for demodulating the modulated voice data for output to said voice processing section as the input voice data, means for modulating the output voice data from said voice processing section, and means for transmitting the modulated voice data during a second communication channel time slot corresponding to a second communication channel;

a communication channel quality detecting section for detecting deterioration of quality of a communication channel between said mobile station unit and said first base station unit during communication between said mobile station unit and said first base station unit;

a synchronization section for providing timing signals to said voice processing section; and a control section connected to said voice processing section, said radio section, said detecting section, and said synchronization section for controlling operation of said mobile station unit, said control section including interrupting means, responsive to a detection of deterioration of the quality of a communication channel between said mobile base station unit and said first base station unit, for interrupting communication between said first base station unit and said mobile station unit during a time frame in which a first control channel of said second base station unit having predetermined control information is to be received, setting means responsive to said interrupting means for setting a receiving frequency of said radio station to a control channel frequency corresponding to said first control channel during said time frame, and detecting means for attempting to detect said predetermined control information during a control channel time slot corresponding to said first control channel of said time frame;

channel switching means for terminating communication with said first base station unit and connecting said mobile station unit to said second base station unit in accordance with said predetermined control information if said predetermined control information is detected; and means for restoring communication between said mobile station unit and said first base station unit if said predetermined control information is not detected.

2. The mobile station unit according to claim 1, wherein said first control channel of said time frame is a broadcasting control channel (BCCH) and said predetermined control information is broadcasting control information.

3. The mobile station unit according to claim 2, wherein said time frames constitute a sequence of time frames and frames containing the broadcasting control channel (BCCH) occur every N frames in the sequence.

4. The mobile station unit according to claim 3, wherein N=10.

5. The mobile station unit according to claim 1, wherein time slots of the control and communication channels between said mobile system unit and said first base station unit are synchronized with time slots of the control and communication channels between said mobile system unit and said second base unit.

6. The mobile station unit according to claim 1, wherein time slots of the control and communication channels between said mobile system unit and said first base station unit are not synchronized with time slots of the control and communication channels between said mobile system unit and said second base unit, and said mobile station unit further includes means for storing a timing relationship between the time slots of the control and communication channels between said mobile system unit and said first base station unit and the time slots of the control and communication channels between said mobile system unit and said second base unit.

7. A channel switching method for use in a mobile radio system including a mobile station unit connectable to first and second base station units over control and communication channels arranged in frames each including communication channel time slots corresponding to respective communication channels and at least one control channel time slot corresponding to a control channel, said method comprising:

a supervisory process including a step of detecting deterioration of a quality of a communication channel between said mobile station unit and said first base station during communication between said mobile station unit and said first base station;

an interrupt process responsive to said supervisory process, said interrupt process including steps of said mobile station unit interrupting communication between said first base station unit and said mobile station unit during a time frame in which a first control channel of said second base station unit having predetermined control information is to be received, receiving a frequency corresponding to said first control channel during said time frame, and attempting to detect said predetermined control information during a control channel time slot corresponding to said first control channel of said time frame;

a channel switching process including steps of said mobile station unit terminating communication with said first base station unit and connecting to said second base station in accordance with said predetermined control information if said predetermined control information is detected; and a restoring process including a step of said mobile station unit restoring communication between said mobile station unit and said first base station unit if said predetermined first control information is not detected.

8. The method according to claim 7, wherein said first control channel of said time frame is a broadcasting control channel (BCCH) and said predetermined control information is broadcasting control information.

9. The method according to claim 7, wherein said time frames constitute a sequence of time frames and frames containing the broadcasting control channel (BCCH) occur every N frames in the sequence.

10. The method according to claim 9, wherein N=10.

11. The method according to claim 7, wherein said channel switching process comprises the steps of:

continuing to receive the frequency corresponding to said first control channel of said second base station unit;

calculating a paging channel (PCH) for establishing a connection to said second base station unit;

receiving another frame including a control channel time slot corresponding to the calculated PCH;

transmitting a link establish request;

determining whether said link is established; and setting a communication channel if said link is established.

12. A mobile station unit connectable to first and second base station units over control and communication channels arranged in frames each including communication channel time slots corresponding to respective communication channels and at least one control channel time slot corresponding to a control channel, said mobile station unit comprising:

means for establishing communication channels between said mobile station unit and said first and second base station units; and a control section including:

interrupting means for interrupting communication between said first base station unit and said mobile station unit during a time frame in which a first control channel of said second base station unit having predetermined control information is to be received;

setting means responsive to said interrupting means for setting a receiving frequency of said mobile station unit to a control channel frequency corresponding to said first control channel during said time frame;

detecting means responsive to said setting means, attempting to detect said predetermined control information during a control channel time slot corresponding to said first control channel of said time frame;

channel switching means for terminating communication with said first base station unit and connecting said mobile station unit to said second base station unit in accordance with said predetermined control information if said predetermined control information is detected; and means for restoring communication between said mobile station unit and said first base station unit if said predetermined control information is not detected.

13. A mobile station unit connectable to first and second base station units over control and communication channels arranged in frames each including communication channel time slots corresponding to respective communication channels and at least one control channel time slot corresponding to a control channel, said mobile station unit comprising:

means for establishing communication channels between said mobile station unit and said first and second base station units;

a communication channel quality detecting section for detecting deterioration of a quality of a communication channel between said mobile station unit and said first base station unit during communication between said mobile station unit and said first base station unit; and a control section connected to said detecting section, said control section including:

interrupting means, responsive to a detection of deterioration of the quality of a communication channel between said mobile base station unit and said first base station unit, for interrupting communication between said first base station unit and said mobile station unit during a time frame in which a first control channel of said second base station unit having predetermined control information is to be received;

setting means responsive to said interrupting means for setting a receiving frequency of said mobile station unit to a control channel frequency corresponding to said first control channel during said time frame;

detecting means responsive to said setting means, for attempting to detect said predetermined control information during a control channel time slot corresponding to said first control channel of said time frame;

channel switching means for terminating communication with said first base station unit and connecting said mobile station unit to said second base station unit in accordance with said predetermined control information if said predetermined control information is detected; and means for restoring communication between said mobile station unit and said first base station unit if said predetermined control information is not detected.

* * * * *